United States Patent [19]

Murray et al.

[11] 4,019,917
[45] Apr. 26, 1977

[54] EARLY STRENGTH CEMENTS

[75] Inventors: Ransom James Murray, Gravesend; Arthur William Brown, London, both of England

[73] Assignee: The Associated Portland Cement Manufacturers Limited, London, England

[22] Filed: Dec. 1, 1975

[21] Appl. No.: 636,457

[30] Foreign Application Priority Data

Dec. 9, 1974 United Kingdom ............ 53104/74

[52] U.S. Cl. .................................. 106/89; 106/104
[51] Int. Cl.² ...................... C04B 7/02; C04B 7/32; C04B 7/35
[58] Field of Search ............................. 106/104, 89

[56] References Cited

UNITED STATES PATENTS

| | | | |
|---|---|---|---|
| 2,099,176 | 11/1937 | Scripture | 106/104 |
| 3,645,750 | 2/1972 | Sadran | 106/104 |
| 3,861,929 | 1/1975 | Deets et al. | 106/104 |

*Primary Examiner*—J. Poer
*Attorney, Agent, or Firm*—Baldwin, Wight & Brown

[57] ABSTRACT

An early strength hydraulic cement comprising 7 to 90 per cent $C_{12}A_7$ formed in an underlimed clinker burned to a low free lime, the underlimed condition being at least counterbalanced in the cement by a substance effective to raise the basicity.

16 Claims, No Drawings

EARLY STRENGTH CEMENTS

This invention relates to early strength cements, that is, cements which set and harden unusually rapidly in order to give appreciable strength very soon after use.

It is known that a very rapidly setting and hardening cement can be produced by mixing Portland cement and high alumina cement, and/or by the use of various accelerators. By high alumina cement is meant cement in which the principal hydraulic constituent is monocalcium aluminate (CA). The improvement obtained in early strength is generally at some expense in the ultimate strength of the cement obtained, but the main disadvantage of known methods of obtaining early strength is that when very rapid setting and hardening is required, it is difficult to obtain consistent and reproducible results, the actual rate of setting and hardening being insufficiently controllable, particularly when making a concrete with an aggregate contaminated with or containing substances capable of acting as accelerators or retarders since very small quantities of such substances can have a drastic effect on the setting times achieved. A further disadvantage of rapid setting Portland cements in which accelerators have been incorporated is that many of the applications in which rapid setting cements are most useful are those which may involve the pumping of a slurry of the cement or a concrete containing it, and such Portland cements do not give good results with higher than normal water to cement ratios. High alumina cements on the other hand are expensive.

It is known that a cement containing the calcium aluminate of the formula $12\ CaO.7\ Al_2O_3$, commonly abbreviated to $C_{12}A_7$, has the property of setting and hardening almost instantaneously upon admixture with water. For this reason, it has been sought to avoid the formation of $C_{12}A_{17}$ during the production of high alumina cements because of the substantial and unpredictable acceleration of setting and hardening that may be caused by the presence of quite small proportions of $C_{12}A_7$.

We found, however, that by utilising $C_{12}A_7$ to provide a substantial proportion of the hydraulic constituents of a cement which does not have a large CA content and is not a high alumina cement as normally understood, the balance being mainly hydraulic calcium silicates, usually together with retarders and/or accelerators selected and proportioned to provide a desired delay in setting to enable working, it is possible to obtain a rapidly setting and hardening cement giving concretes having acceptable early strength even at higher than normal water to cement ratios but at the same time having a setting time which is controllable even in the presence of contaminants.

Accordingly in our British Patent Specification No. 1,387,075 we described a type of early strength hydraulic cement in which $C_{12}A_7$ forms 7 to 90 percent, usually 10 to 70 percent and preferably 15 to 30 percent, by weight of its content of hydraulic constituents, a majority of the balance being hydraulic calcium silicates. Preferably the cement of this type includes retarders and/or accelerators effective to provide a desired setting time sufficient for the purpose for which the cement is intended. The preferred retarders are known organic retarders for Portland cements such as citric acid, lignosulfonates or sugars.

The preferred accelerators can be additions made to the raw feed such as alkali metal compounds which are retained within the clinker in the form of alkali metal sulphates during burning or form solid solutions within the primary phases present, or additions such as $K_2SO_4$ or the double sulphate $K_2SO_4.2CaSO_4$, conventional accelerators for Portland cement, or grinding aids such as a mixture of triethanolamine and acetic acid or commercially available organic based grinding aids, made at the grinding stage or blended into the final cement.

Preferably quantities of calcium sulphate in the form of natural or synthetic gypsums and anhydrites are incorporated in the cement of this type in order to obtain optimum strength development. These additions slightly retard the set, but further retardation is possible with conventional organic retarders as mentioned above. In some instances the addition during grinding of a small quantity of water will provide a retarding action.

The cement of the aforesaid type preferably comprises a mixture of a cement prepared from a clinker produced by selecting and fusing or sintering a mixture of siliceous, calcareous and aluminous material proportioned to yield a product rich in $C_{12}A_7$ and poor in CA or $C_3A$ (these two phases normally cannot be formed together) with a conventional Portland cement, calcium sulphate and the selected retarders or accelerators.

In preparing cements of the aforesaid type we have found that the initial strength development and setting characteristics of the cement are dependent on the basicity of the special $C_{12}A_7$-rich clinker and the degree of burning, as judged by the free lime, that is clinker has undergone. In the case of pure $C_{12}A_7$-rich clinkers containing negligible impurities and regarding only the $SiO_2$, $Al_2O_3$, $Fe_2O_3$ and CaO components, if the lime in the mix from which the clinker is made exceeds that required to form $C_2S$, $C_{12}A_7$ and $C_4AF$, as defined by the potential compound composition, then the mix can be regarded as potentially over-limed and a lime-$C_{12}A_7$ solid solution may form or in some instances $C_3A$ may also be produced at the expenses of $C_{12}A_7$. However, if by the same method of calculation, the lime in the mix is less than that required to form $C_2S$, $C_{12}A_7$ and $C_4AF$, then the mix can be regarded as potentially underlimed and an alumina - $C_{12}A_7$ solid solution may form or the discrete phase CA may be produced at the expense of $C_{12}A_7$. This degree of under- or over-liming can be estimated by a lime limitation factor (LLF) where $$LLF = \frac{CaO}{1.87\ SiO_2 + 0.94\ Al_2O_3 + 0.65\ Fe_2O_3}$$

such that when $LLF < 1$ the mix is underlimed.

In the overlimed situation, we have found that the formation of a clinker containing either a lime-rich solid solution of $C_{12}A_7$ or a mixture of $C_{12}A_7$ and $C_3A$ leads to a cement with a slightly poorer initial strength development, but a shorter setting time necessitating the use of more citric acid to control its pumpability, than the initial strength development and setting time achieved using a $C_{12}A_7$-rich clinker containing just sufficient lime to form only the $C_{12}A_7$, $C_4AF$ and $C_2S$ phases. In both these instances optimum strengths are obtained at free lime contents, as determined by the hot ethylene glycol method, of approximately 2 percent. Burning either very hard to free lines less than 1 percent or soft to free limes greater than 3 percent leads to a depreciation in strength.

With the underlimed mix herein defined, we have found that burning a clinker to approximately 2 percent free lime as determined above leads to a cement with both similar initial strength development and setting characteristics to those achieved using a $C_{12}A_7$-rich clinker just sufficiently limed as previously defined and burned to a similar free lime. If, however, underlimed mixes are burned to clinkers with very low free limes particularly below 0.6 percent then the initial strength development of the resultant cement is significantly poorer than that achieved with either a just sufficiently limed composition or an overlimed composition burned to similar low free limes.

In practice during the production of the special $C_{12}A_7$-rich clinker, typical variations in the clinker analysis between an LLF of 0.97 and 1.03 are encountered as a result of the varying raw feed analysis within the quality control limits and the varying coal ash absorption which occurs during firing. This leads to the formation of a $C_{12}A_7$-rich clinker in which the $C_{12}A_7$ phase is either an under- or over-limed solid solution phase, or the $C_{12}A_7$ is accompanied by the discrete phases of either $C_3A$ or CA which themselves are produced at the expense of $C_{12}A_7$. Such clinkers when interground or blended with an ordinary Portland cement composition produce cements in which both the optimum early strength development and minimum citric acid addition are not achieved. This situation is further aggravated by the sensitivity of the degree of combination of these compositions, as judged by their uncombined lime, to the firing temperature. We have found that when sintering this $C_{12}A_7$-rich composition in conventional cement making processes the production of a clinker with free lime contents in the range of 1.0 to 7.0 percent commonly occurs when attempts to burn to an average free lime of 2 percent are made. Only by hard burning, leading to a product with a low average free lime content, are steady kiln running conditions achieved and clinker ring build-ups minimised.

We have found, therefore, that from the point of view of kiln economics and the usage of citric acid, or alternative organic retarders, an underlimed $C_{12}A_7$-rich clinker (LLF<1.0) is preferable, whereas from the point of view of initial early strength development either the use of an overlimed composition is preferable or it is essential to ensure that the underlimed composition is burned to an average free lime of 2 percent.

An object of the present invention is to produce a high early strength cement from an underlimed $C_{12}A_7$-rich clinker burned to a low free lime content but without loss in the initial strength development.

A further object of the invention is to provide a cement of the aforesaid type but which requires less or no organic retarder such as citric acid, to achieve the desired pumpability time and delay in setting time.

It is known that minor impurities in the raw mix, such as MgO, can on burning, enter into solid solution in the major phases by substituting for CaO in their lattices. It is also known that some transition metal oxides, such as ferric oxide ($Fe_2O_3$) which may also be present as impurities can, on burning in a reducing atmosphere and maintaining this atmosphere while cooling, be reduced to their lower valency oxides, such as ferrous oxide (FeO) and that this reduced oxide can then enter into solid solution in the major phases by substituting for CaO in their lattices. We have found that substitutions of this nature in an underlimed $C_{12}A_7$-rich clinker as defined by its LLF can lead to an increase in the basicity of that clinker. When the basicity is due in part to substitutions of this nature, we refer to the clinker as effectively under- or over-limed according to whether the basicity is equivalent to an LLF of less than or more than unity. If the increase in basicity is such that the clinker becomes effectively just sufficiently limed or even effectively overlimed then the resultant cement has an initial strength development similar to that obtained using an overlimed composition as defined by its LLF. The setting times of cements produced from such underlimed $C_{12}A_7$-rich clinkers as defined by their LLF but containing substitutional solid solutions are often shorter, requiring more retarder to achieve the same pumpability. This may arise because the presence of solid solution substitution in the $C_{12}A_7$ phase modifies the structure and enhances its intrinsic reactivity.

In spite of this requirement for increased retarder content to maintain pumpability, the increase in basicity of the $C_{12}A_7$-rich clinker by the formation of solid solutions from other oxides to the point where the composition is effectively just sufficiently limed or even overlimed has important practical implications. Firstly, such compositions, even if burned hard to low free limes, do not produce cement with the very poor initial strength development which is characteristic of a pure underlimed composition. Secondly, by burning and cooling the mix in a reducing atmosphere such that most if not all of the $Fe_2O_3$ present is reduced to and maintained as FeO, it is possible to preclude or significantly reduce the amount of the calcium alumino-ferrite phase in the clinker. This allows more of the alumina, the source of which is the expensive ingredient, to contribute to the formation of the desired $C_{12}A_7$ phase and thus permits the incorporation in the mix of cheaper ferruginous materials and materials of lower overall alumina content. Moreover, we have found that in some instances when MgO contributes to the increase of the basicity of the $C_{12}A_7$-rich clinker it is not necessary to selectively quarry or maintain strict control of the magnesia level in the raw feed in order to avoid the incidence of excessive discrete particles of periclase in the clinker which may occur if solid solution limits are exceeded and which could lead to the production of an unsound cement. This unsoundness may be tolerable because in some of the applications of this cement, such as the bonding of coal or aggregates contaminated with coal, to form packs alongside roadways associated with advance long wall coalmining, the long term stability of the cement is not essential.

We have also found, however, that if an addition of a source of calcium ions ($Ca^{2+}$) is made to a cement prepared from an effectively underlimed $C_{12}A_7$-rich clinker which has also been burned to a low free lime content, particularly below 0.6 percent, then not only does this addition restore the initial strength development to that which would have been achieved had this composition been burned to a higher free lime content or the cement had been prepared from an effectively overlimed $C_{12}A_7$-rich clinker, but surprisingly it actually reduces the citric acid addition required at a given cement $SO_3$ content to achieve the desired delay in setting time. This source of calcium ions, typically of the order of 1 to 2 percent by weight of the cement, may be provided in the form of free or uncombined lime in Portland cement clinker blended with the $C_{12}A_7$-rich clinker, by deliberately producing for this purpose a Portland cement clinker with an appropriate free lime content. Alternatively an addition of calcined lime, calcium hydroxide, calcium chloride, or any other suitable source of $Ca^{2+}$ ions, can also be made.

Calcium chloride, depending on the level of addition, is known to have a retarding or an acceleratig effect on the setting and strength development of some cements. Surprisingly we have found with the compositions specified in this invention that both a retardation of the set and an acceleration of the initial strength development are achieved together, when calcium chloride is added to a cement prepared from an effectively underlimed $C_{12}A_7$-rich clinker such that not only is the strength development similar to that obtained when using an effectively overlimed $C_{12}A_7$-rich clinker or an effectively underlimed clinker burned to a higher free lime, but the need for citric acid or another organic retarder to control the set is maintained or even completely eliminated.

According to the present invention we provide an early strength hydraulic cement comprising 7 to 90 percent, usually 10 to 70 percent, and preferably 15 to 30 percent by weight of $C_{12}A_7$, the majority of the balance being hydraulic calcium silicates, characterised in that the $C_{12}A_7$ phase is formed in an underlimed clinker as herein defined burned to a low free lime; and in that the underlimed condition is at least counterbalanced in the cement by the presence of a substance effective to increase the basicity of the composition. The substance effective to increase the basicity may be a metal oxide such as MgO or FeO present in the clinker-forming mix which enters into solid solution in the major phases in the clinker by substituting for CaO in the lattices thereof or the substance effective to increase the basicity may be a suitable source of calcium ions added to the cement prepared from the underlimed clinker.

It will be appreciated that, whilst in the case of restoring the basicity of the underlimed clinker by making additions of oxides which enter into solid solution in the major phases of this clinker, it is possible to detect such solid solutions by X-ray diffraction techniques, the counterbalancing of the underlimed condition, so that the basicity approached that equivalent to a lime limitation factor of at least unity, may be more accurately estimated by comparing the strengths and setting times of the cement under consideration with those of a cement which is exactly similar except in that it has a lime limitation factor known to be unity.

The cement of the present invention preferably comprises a mixture of (a) a cement prepared from a clinker produced by selecting and fusing or sintering a mixture of siliceous, calcareous and aluminous material proportioned to yield a product rich in $C_{12}A_7$ and poor in CA or $C_3A$ and which, although underlimed as hereinbefore defined, may contain sufficient metallic oxides in solid solution in its major phases to increase its basicity, with (b) a conventional Portland cement, calcium sulphate, a suitable source of calcium ions if these are required to effectively increase the basicity of the final cement and improve its strength development, and selected retarders or accelerators. Subject to the requirements herein regarding their basicity, the clinker and cement of the present invention may be prepared in the manner described in British Patent Specification No. 1,387,075, and may incorporate the same retarders and accelerators and similar additions of calcium sulphate.

Although the $C_{12}A_7$-rich clinker, usually with the addition of gypsum and accelerators or retarders, could be utilised on its own, a cheaper product is obtained when it is blended with Portland cement. Such a blended product can have higher early strength and better strength development than cements formed from the $C_{12}A_7$-rich clinker alone, if the $C_{12}A_7$ content of the final cement is 15 to 30 percent by weight and the $C_3S$ content is 10 to 70 percent by weight.

Preferably the $C_{12}A_7$-rich clinker is ground together with a Portland cement clinker and a calcium sulphate sufficient to give an $SO_3$ content of up to 7.5 percent of the final cement, including the $SO_3$ content of the clinkers, a suitable source of calcium ions if this is required to increase the basicity and achieve the desired strength development, and a small amount of retarder or accelerator in accordance with the setting properties required.

In general the incorporation in the raw mix of suitable metal oxides which will enter into solid solution in the major phases of the $C_{12}A_7$-rich clinker, is achieved by the judicious choice of raw materials in which these oxides occur. Alternatively a small addition of a pure oxide can be made, but in this instance particular care must be taken to ensure its homogeneous distribution in the mix. For some oxides, such as MgO, substitution for CaO in the phases is achieved during burning in normal atmospheres. For other oxides, such as $Fe_2O_3$, it is necessary to maintain a sufficiently reducing atmosphere during burning to achieve the reduced oxide FeO in solid solution, and a reducing atmosphere during cooling is required to prevent the reoxidation of this oxide, until the clinker is sufficiently cool to preclude reoxidation.

Calcium oxide, calcium hydroxide or calcium chloride can be incorporated in the cement in several ways. In one method the addition may be made at the stage of grinding $C_{12}A_7$-rich and Portland cement clinkers together. A second method involves blending the addition in a finely divided form with the cement prior to packing. In a third method, which is also possible in certain circumstances, the additive can be supplied separately to the user who may add it during mixing in order to suit his own requirements.

The following Examples are given to illustrate the invention, all percentages, ratios and parts being by weight.

EXAMPLE 1

A clinker rich in $C_{12}A_7$ was prepared as follows. A limestone whose principal constituents were $SiO_2$ 1.4 percent, $Al_2O_3$ 0.7 percent, $Fe_2O_3$ 0.7 percent and CaO 53.7 percent, a China clay whose principal constituents were $SiO_2$ 48.2 percent, $Al_2O_3$ 36.0 percent, $Fe_2O_3$ 1.1 percent and CaO 0.1 percent and a calcined bauxite whose principal constituents were $SiO_2$ 13.2 percent, $Al_2O_3$ 78.2 percent, $Fe_2O_3$ 2.7 percent, and CaO 0.5 percent were blended to form a raw feed in the approximate proportions 71.5 percent limestone, 23.0 percent China clay and 5.5 percent bauxite and ground in a ball mill to a residue of 10 percent on a BSS 90 μm sieve. This raw feed was sintered in a rotary coal fired kiln at approximately 1300° C to give a free lime content of 0.45 percent as determined by the hot ethylene glycol method. As a result of ash absorption during firing, the final clinker had an analysis of:

| | | |
|---|---|---|
| SiO$_2$ | 20.4 | percent |
| Al$_2$O$_3$ | 19.1 | percent |
| Fe$_2$O$_3$ | 1.9 | percent |
| Mn$_2$O$_3$ | 0.03 | percent |
| P$_2$O$_5$ | 0.12 | percent |
| TiO$_2$ | 0.23 | percent |
| CaO | 56.6 | percent |
| MgO | 0.5 | percent |
| SO$_3$ | 0.3 | percent |
| K$_2$O | 0.60 | percent |
| Na$_2$O | 0.16 | percent |

The lime factor as defined by:

$$LLF = \frac{CaO}{1.87\, SiO_2 + 0.94\, Al_2O_3 + 0.65\, Fe_2O_3}$$

was 0.99, the silica ratio (S/A+F) was 0.97 and the alumina ratio (A/F) was 10.05.

The potential compound composition of the clinker as calculated from its oxide analysis was:

| | |
|---|---|
| C$_4$AF | 5.8 percent |
| CA | 7.3 percent |
| C$_{12}$A$_7$ | 25.6 percent |
| C$_2$S | 58.5 percent | together with magnesia, free lime and other minor phases to 100 percent.

A cement was prepared by intergrinding 60 percent of the C$_{12}$A$_7$-rich clinker described above with 40 percent of a Portland cement clinker, gypsum and citric acid to a surface area of 450 m$^2$/kg as measured by the air permeability method specified in BSS 12 (1971). The Portland cement clinker had an analysis of:

| | |
|---|---|
| SiO$_2$ | 20.7 percent |
| Al$_2$O$_3$ | 6.7 percent |
| Fe$_2$O$_3$ | 3.8 percent |
| CaO | 66.7 percent |
| MgO | 0.5 percent |
| SO$_3$ | 0.1 percent |
| K$_2$O | 0.2 percent |
| Na$_2$O | 0.1 percent |

The lime saturation factor (LSF) of this clinker as defined by:

$$LSF = \frac{CaO}{2.8\, SiO_2 + 1.2\, Al_2O_3 + 0.65\, Fe_2O_3}$$

was 0.97, the silica ratio 1.97, the alumina ratio 1.76 and the free lime content 3.5 percent.

The quantity of gypsum added was such as to yield a final SO$_3$ content in the cement of 2.5 percent as determined by analysis and the amount of citric acid added was 0.15 percent.

The pumpability time of a cement water grout having a water-cement ratio of 0.5 was 16 minutes. When used as a binder for coal shale, the overall composition of the mix being 1 part cement 6 parts dry shale and 2 parts water, the setting time of the coal mix slurry produced was approximately 40 minutes and the compressive strengths of 100 mm cubes were:

| | | |
|---|---|---|
| After | 2 hours | 110 psi |
| | 4 hours | 110 psi |
| | 24 hours | 120 psi |

EXAMPLE 2

A cement was prepared as in Example 1, by intergrinding 60 percent of the C$_{12}$A$_7$-rich clinker described in Example 1 with 40 percent of a Portland cement clinker, gypsum, calcium hydroxide and citric acid. The Portland cement clinker had an analysis of:

| | |
|---|---|
| SiO$_2$ | 20.9 percent |
| Al$_2$O$_3$ | 5.6 percent |
| Fe$_2$O$_3$ | 3.7 percent |
| CaO | 66.5 percent |
| MgO | 1.2 percent |
| SO$_3$ | 0.8 percent |
| K$_2$O | 0.6 percent |
| Na$_2$O | 0.4 percent |

The lime saturation factor was 0.98, the silica ratio 2.25, the alumina ratio 1.51 and the free lime content 1.6 percent.

The cement was ground to a surface area as determined by the previously specified method of 460 m$^2$/kg. The quantity of gypsum added was such as to yield a final SO$_3$ content in the cement of 2.5 percent as determined by analysis, the amount of hydrated lime added was 2 percent and the amount of citric acid was 0.15 percent.

The pumpability time of a cement water grout having a water-cement ratio of 0.5 was 15 minutes. When used as a binder for coal shale as in the previous Example the setting time of the slurry produced was approximately 45 minutes and the compressive strengths of 100 mm cubes were:

| | | |
|---|---|---|
| After | 2 hours | 120 psi |
| | 4 hours | 130 psi |
| | 24 hours | 140 psi |

EXAMPLE 3

A cement was prepared as in Example 2, except that an addition of 0.8 percent anhydrous calcium chloride was made at the grinding stage. No addition of hydrated lime or citric acid was made.

The pumpability time of a paste having a water-cement ratio of 0.5 was 18 minutes. When used as a binder for coal shale as in the various Example the setting time of the slurry produced was approximately 40 minutes and the compressive strengths of 100 mm cubes were:

| | | |
|---|---|---|
| After | 2 hours | 120 psi |
| | 4 hours | 130 psi |
| | 24 hours | 140 psi |

EXAMPLE 4

A clinker rich in C$_{12}$A$_7$ was prepared as follows:
The following raw materials with partial oxide analyses of:

|        | Chalk | China Clay | Alumina |
|--------|-------|------------|---------|
| $SiO_2$ | 1.8 | 48.2 | |
| $Al_2O_3$ | 0.2 | 36.0 | 99.9 |
| $Fe_2O_3$ | 0.1 | 1.1 | |
| CaO | 54.4 | 0.1 | | were utilised to form a mix by blending in the appropriate proportions (dry basis) 66.9 percent chalk, 12.0 percent china clay, 21.1 percent alumina and grinding in a ball mill to a residue of 5 percent on a BS 90 μm sieve. The raw mix so obtained was mixed with water, pressed into cakes, and these, after thoroughly drying, were sintered in an oil fired furnace at about 1300° C to produce a clinker with the following chemical analysis:

| | | |
|---|---|---|
| $SiO_2$ | 9.8 | percent |
| $Al_2O_3$ | 36.2 | percent |
| $Fe_2O_3$ | 0.4 | percent |
| CaO | 51.6 | percent |
| MgO | 1.0 | percent |
| $SO_3$ | 0.25 | percent |
| $K_2O$ | 0.4 | percent |
| $Na_2O$ | 0.1 | percent |

The lime limitation factor was 0.98, the silica ratio 0.27, the alumina ratio 90.5 and the free lime, as determined by the method previously defined, 0.4 percent.

The potential compound composition of the clinker as calculated from its oxide analysis was:

| | |
|---|---|
| $C_4AF$ | 1.2 percent |
| CA | 5.8 percent |
| $C_{12}A_7$ | 62.5 percent |
| $C_2S$ | 28.1 percent | together with magnesia, free lime and other minor phases to 100 percent.

A cement was prepared by intergrinding 75 percent of this $C_{12}A_7$-rich clinker with 25 percent by weight of the Portland cement clinker described in Example 2, together with gypsum, hydrated lime and citric acid to a surface area of 450 m²/kg as measured by the previously specified method. The quantity of gypsum added was such as to yield a final $SO_3$ content in the cement of 2.0 percent as determined by analysis; the amount of hydrated lime added was 2 percent and the amount of citric acid added was 0.5 percent.

The pumpability time of a paste having a water-cement ratio of 0.5 was 16 minutes. When used as a binder for coal shale as in Example 1 the setting time of the slurry produced was approximately 15 minutes and the compressive strengths of 100 mm cubes were:

| After | 2 hours | 150 psi |
|---|---|---|
| | 4 hours | 160 psi |
| | 24 hours | 165 psi |

EXAMPLE 5

A cement was prepared by intergrinding 20 percent of the $C_{12}A_7$-rich clinker described in Example 4 with 80 percent of the Portland cement clinker described in Example 2, together with gypsum, hydrated lime and citric acid to a surface area of 460 m²/kg as measured by the previously specified method. The quantity of gypsum added was such as to yield a final $SO_3$ content in the cement of 2.0 percent as determined by analysis; the amount of hydrated lime added was 1 percent and the amount of citric acid added was 0.15 percent.

The pumpability time of a paste having a water-cement ratio of 0.5 was 16 minutes. When used as a binder for coal shale as in Example 1 the setting time of the slurry produced was approximately 75 minutes and the compressive strengths of 100 mm cubes were:

| After | 2 hours | 60 psi |
|---|---|---|
| | 4 hours | 65 psi |
| | 24 hours | 70 psi. |

EXAMPLE 6

A clinker rich in $C_{12}A_7$ was prepared as in Example 4 from a limestone contaminated with magnesium carbonate, together with china clay and bauxite to produce a clinker with the analysis:

| | | |
|---|---|---|
| $SiO_2$ | 21.0 | percent |
| $Al_2O_3$ | 17.1 | percent |
| $Fe_2O_3$ | 0.6 | percent |
| CaO | 53.8 | percent |
| MgO | 5.8 | percent |
| $SO_3$ | 0.15 | percent |
| $K_2O$ | 0.20 | percent |
| $Na_2O$ | 0.08 | percent |

The lime limitation factor was 0.97, the silica ratio 1.19, the alumina ratio 28.5 and the free lime, as determined by the method previously described, 0.6 percent. The presence of MgO in solid solution was confirmed by X-ray diffraction techniques.

The potential compound composition of the clinker as calculated from its main oxide analysis and ignoring substitution by MgO in solid solution was:

| | |
|---|---|
| $C_4AF$ | 1.8 percent |
| CA | 10.2 percent |
| $C_{12}A_7$ | 19.7 percent |
| $C_2S$ | 60.2 percent | together with free lime and other phases to 100 percent.

A cement was prepared by intergrinding 60 percent of this $C_{12}A_7$-rich clinker with 40 percent by weight of the Portland cement clinker described in Example 2, together with gypsum and citric acid to a surface area of 450 m²/kg as measured by the previously specified method. The quantity of gypsum added was such as to yield a final $SO_3$ content in the cement of 2.0 percent as determined by analysis, and the amount of citric acid added was 0.4 percent.

The pumpability time of a paste having a water-cement ratio of 0.5 was 16 minutes. When used as a binder for coal shale as in Example 1 the setting time of the slurry produced was approximately 30 minutes and the compressive strengths of 100 mm cubes were:

| After | 2 hours | 90 psi |
|---|---|---|
| | 4 hours | 95 psi |

-continued

| 24 hours | 110 psi. |
|---|---|

EXAMPLE 7

A clinker rich in $C_{12}A_7$ was prepared as follows:
The following raw materials with partial oxide analyses of:

|  | Limestone | Pulverised Fly Ash | Bauxite |
|---|---|---|---|
| $SiO_2$ | 1.8 | 44.0 | 3.6 |
| $Al_2O_3$ | 0.6 | 29.4 | 90.2 |
| $Fe_2O_3$ | 0.9 | 9.2 | 1.3 |
| $CaO$ | 53.6 | 2.6 | 0.9 | were utilized to form a mix by blending in the appropriate proportions (dry basis) 68.0 percent limestone, 28.0 percent pulverised fly ash, 4.0 percent bauxite and grinding in a ball mill to a residue of 5 percent on a BS 90 μm sieve. The raw feed so obtained was mixed with water, pressed into cakes, and these, after thoroughly drying, were sintered in an oil fired furnace at about 1280° C in an atmosphere sufficiently reducing to produce mainly FeO at the expense of $Fe_2O_3$. The resultant clinker, which was also cooled in a reducing atmosphere to around 700° C to prevent the reoxidation of the ferrous oxide, gave the following chemical analysis:

| $SiO_2$ | 20.8 | percent |
|---|---|---|
| $Al_2O_3$ | 18.0 | percent |
| $Fe_2O_3$ | 1.0 | percent |
| FeO | 3.1 | percent |
| CaO | 54.5 | percent |
| MgO | 1.0 | percent |
| $SO_3$ | 0.01 | percent |
| $K_2O$ | 0.05 | percent |
| $Na_2O$ | 0.02 | percent |

The presence of FeO in solid solution was confirmed by X-ray diffraction techniques. Ignoring this solid solution effect, the lime limitation factor was 0.97, the silica ratio was 1.09, the alumina ratio was 18.0 and the free lime as determined by the method previously described was 0.4 percent.

The potential compound composition of the clinker as calculated from its main oxide analysis and ignoring possible CaO substitution by FeO in solid solution was:

| $C_4AF$ | 3.0 percent |
|---|---|
| CA | 9.6 percent |
| $C_{12}A_7$ | 21.7 percent |
| $C_2S$ | 59.6 percent | together with free lime and other phases to 100 percent.

A cement was prepared by intergrinding 60 percent of this $C_{12}A_7$-rich clinker with 40 percent by weight of the Portland cement clinker described in Example 2, together with gypsum and citric acid to a surface area of 450 m²/kg as measured by the previously specified method. The quantity of gypsum added was such as to yield a final $SO_3$ content in the cement of 2.0 percent as determined by analysis and the amount of citric acid added was 0.4 percent.

The pumpability time of a paste having a water-cement ratio of 0.5 was 14 minutes. When used as a binder for coal shale as in Example 1, the setting time of the slurry produced was approximately 40 minutes and the compressive strengths of 100 mm cubes were:

| After | 2 hours | 80 psi |
|---|---|---|
|  | 4 hours | 90 psi |
|  | 24 hours | 95 psi. |

What is claimed is:

1. An early strength hydraulic cement comprising 7.0 to 90 percent by weight of $C_{12}A_7$, the majority of the balance being hydraulic calcium silicates, characterised in that the $C_{12}A_7$ phase is formed in an underlimed clinker burned to a low free lime, an underlimed clinker being defined as a clinker in which the lime limitation factor (LLF) is less than unity where $$LLF = \frac{CaO}{1.87\ SiO_2 + 0.94\ Al_2O_3 + 0.65\ Fe_2O_3}$$

the chemical symbols representing the amounts of the represented substances present; and in that the underlimed condition is at least counterbalanced in the cement by the presence of a substance effective to increase the basicity of the composition.

2. A cement according to claim 1, comprising a mixture of a cement prepared from a clinker rich in $C_{12}A_7$ and poor in other calcium-aluminium compounds, with a Portland cement, said mixture including 10 to 70 percent by weight of $C_{12}A_7$, a majority of the balance comprising calcium silicates and including at least 10 percent by weight of $C_3S$.

3. A cement according to claim 2, wherein said substance effective to increase the basicity of the composition is a metal oxide present in the $C_{12}A_7$ rich clinker in solids solution in substitution for CaO in the lattices of major phases.

4. A cement according to claim 3, wherein said oxide in MgO.

5. A cement according to claim 3, wherein said oxide is FeO.

6. A cement according to claim 2, wherein said substance effective to increase the basicity of the composition is a source of calcium ions added to the cement.

7. A cement according to claim 6, wherein said source of calcium ions is provided in the form of uncombined lime in Portland cement clinker blended with the $C_{12}A_7$-rich clinker.

8. A cement according to claim 6, wherein said source of calcium ions is calcium chloride.

9. A cement according to claim 6, wherein said source of calcium ions is selected from calcined lime and calcium hydroxide.

10. A cement according to claim 2, comprising 15 to 30 percent by weight of $C_{12}A_7$.

11. A cement according to claim 10, comprising 10 to 70 percent of $C_3S$.

12. A cement according to claim 2, incorporating sufficient calcium sulphate to give a total $SO_3$ content of up to 7.5 percent by weight in the finished cement.

13. A cement according to claim 6, wherein said substance is added in an amount of 1 to 2 percent by weight of the cement.

14. A cement according to claim 2, wherein said $C_{12}A_7$ rich clinker has a free lime content of 0.4 tp 0.6 percent.

15. A cement according to claim 3, wherein a source of calcium ions is added to the cement.

16. An early strength hydraulic cement consisting essentially of a mixture of Portland cement and a cement obtained from an underlimed clinker rich in $C_{12}A_7$ and poor in other calcium-aluminum compounds and having a free lime content of less than 1%, said early strength hydraulic cement containing a substance selected from the group consisting of metallic oxides which are present in solid solution in the major phases of said clinker rich in $C_{12}A_7$ and a source of calcium ions added to said early strength hydraulic cement, said substance being present in amount sufficient at least to counterbalance the underlimed condition of said clinker rich in $C_{12}A_7$, and said mixture providing from 7.0 to 90% by weight of said $C_{12}A_7$ with the majority of the balance comprising calcium silicates.

* * * * *